Figure 1:
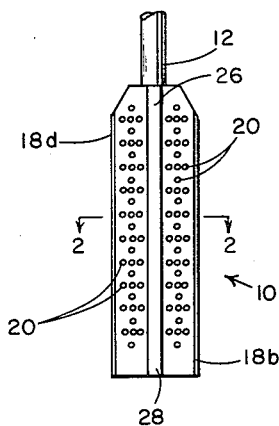

Dec. 24, 1963           H. R. ROCK           3,115,452

COMPOSITE CONTROL ROD

Filed Feb. 24, 1961

INVENTOR.
HARVEY R. ROCK

3,115,452
COMPOSITE CONTROL ROD
Harvey R. Rock, Lynchburg, Va., assignor to the United States of America as represented by the United States Atomic Energy Commission
Filed Feb. 24, 1961, Ser. No. 91,556
3 Claims. (Cl. 204—193.2)

The present invention relates to a composite control rod and more particularly to a composite control rod in which non-neutron absorbing structural material is used to support the neutron absorbing material.

Cruciform shaped control rods of neutron absorbing material are commonly used as a means of controlling the reactivity in a nuclear reactor. These control rods may be movably positioned within the reactor core in channels between the fuel element assemblies. Solid rods of hafnium, boron stainless steel, or a silver-indium-cadmium alloy are usually employed. The cost of fabricating the lengthy rods coupled with the high cost of the neutron absorbing material makes the control rods an expensive item. By using a less expensive structural material to support a neutron absorbing material, the cost of the control rod can be reduced. However, due to large variations in temperature to which such a rod is subject in its movement in and out of the reactive core and the large temperature variation along its length, a composite control rod of this type must be capable of permitting a large degree of different thermal expansions to take place between the two or more different materials.

This invention overcomes this major problem in the design of a composite control rod by providing a unique sandwich construction in which specially designed finned dowels are utilized to hold the construction together. The dowels eliminate any dependence upon the neutron absorbing material for structural characteristics. When relative thermal expansion does occur, the dowel pins seat further in the sandwiched material and will crush before any excessive, damaging stresses are set up in the assembly proper. Control rods, in accordance with this invention, would be useful in the pressurized water reactor of Sankovich et al. disclosed in Ser. No. 790,029, filed January 29, 1959, now Patent No. 2,982,713.

It is thus a first object of this invention to provide a cruciform control rod which is not structurally dependent on the neutron absorbing material.

It is a further object of this invention to provide an extended structural member of sandwiched construction capable of absorbing large stresses due to differential thermal expansion.

It is another object to provide a composite control rod of sandwiched construction capable of withstanding high temperatures.

Still another object is to provide a finned dowel pin for holding together a sandwiched construction subject to excessive stresses including those arising out of differential thermal expansion.

Figure 2A:
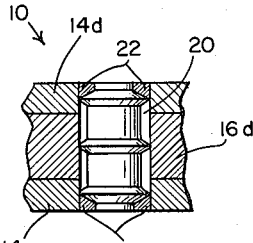
Figure 2:
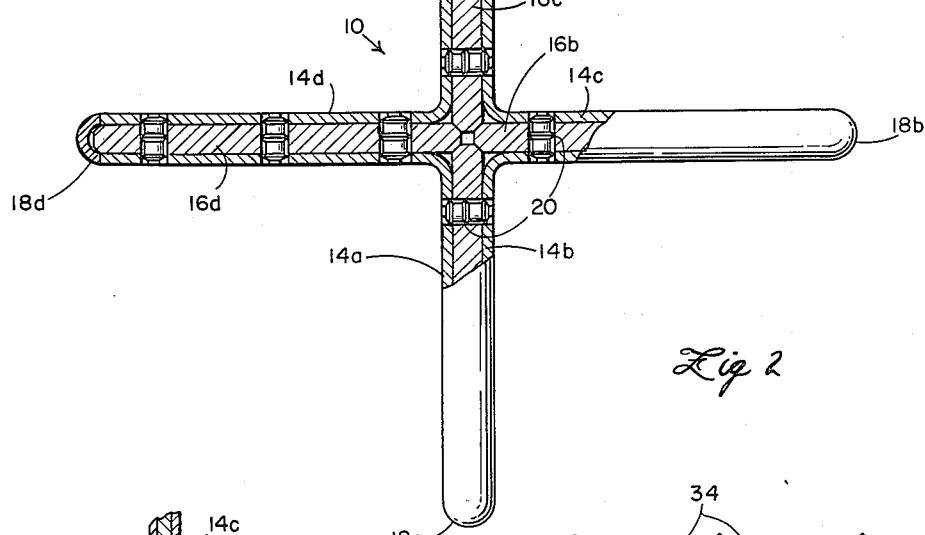
Figure 3:
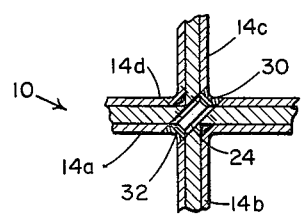
Figure 4:
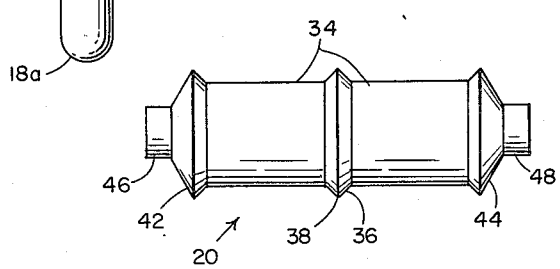

These and other objects of this invention will become more readily apparent from the following description of the invention with particular reference to the attached drawing in which:

FIG. 1 is a schematic elevation view of a portion of a typical cruciform control rod;
FIG. 2 is a section along 2—2 of FIG. 1;
FIG. 2a is a detail of a plug welded dowel;
FIG. 3 is a detail of a similar section as FIG. 2, through a diagonal standard dowel pin; and
FIG. 4 is an elevation detail view of a finned dowel pin.

Referring to FIG. 1, there is shown a typical cruciform section control rod 10 with a support shaft extension 12 extending upward therefrom and for supporting and controlling the movement of rod 10. As is understood in the art, followers, scrubbers, and other miscellaneous features typical of control rods may be added to rod 10 for enhancing its utility and added safety. Control rod 10 may be controllably immersed into a channel passing through the reactive core of a reactor to limit the rate of nuclear fission occurring therein.

The sandwiched construction of rod 10, in accordance with this invention, is shown in FIG. 2 to consist of four extended angles 14a, 14b, 14c and 14d with flat filler strips 16a, 16b, 16c, and 16d separating adjacent legs of angles 14a, b, c and d. Angles 14a–d would be made of a suitable structural metal such as type 304 stainless steel to form the cruciform shape of control rod 10 and provide the structural support required. The filler strips 16a–d sandwiched between the adjacent legs of angles 14a–d would be made from the high neutron absorbing material, such as boron stainless steel. Rounded edge caps 18a, 18b, 18c and 18d may be welded to the angles along the extended edges of the control rod blades as illustrated to finish off the arrangement and present smooth outer surfaces.

To hold the sandwiched construction of control rod 10 together, a plurality of specially designed dowels 20 are used. Oversized holes for dowels 20 are provided as illustrated and the dowels 20, once inserted, are plug welded in the spaces 22 as shown in the detail of FIG. 2a. As appropriate number of dowels 20 may be distributed throughout the blades of rod 10 as shown, for example, in FIG. 1.

As illustrated in FIG. 3, plug welded standard dowels 24, extending diagonally across the intersection of the blades of control rod 10 at the both ends 26 and 28 of rod 10, shown in FIG. 1, may be used to prevent the finned dowels 20 from popping loose during the fabrication of control rod 10. Dowels 24 are welded in at spaces 32 and 34 as illustrated.

Details of a finned dowel 20 are best illustrated in FIG. 4, where it is seen to consist of a solid cylindrical body 34 with a central annular fin 36 with a sharp outer, annular edge 38 for engaging the filler strip. Dowel 20 is provided at both its ends with sharp edge annular fins 42 and 44 for engaging the angle legs and cylindrical extensions 46 and 48. The total length of dowel is slightly less than the depth of the hole into which it is inserted, as shown in FIG. 2a, to permit welding over a smooth surface over the ends of the openings, leaving dowels 20 unexposed.

During the use of control rod 10 to control the operation of a nuclear reactor, the temperature along its length varies in accordance with its position in the core and fluctuates as a result of the movement of rod 10. If substantial relative thermal expansion of the angles and the filler rods occurs, the dowels 20 will tend to seat further in the sandwiched material due to the sharp fins and dowels 20 will crush before any excessive stresses are set up in the assembly proper, thereby insuring the structural integrity of the rod during the most extreme conditions.

It is thus seen that there has been provided a control rod in which the structural characteristics are independent of the neutron absorbing material and, therefore, can be made to meet the nuclear requirements without excessive limitations imposed by structural limitations. Furthermore, this control rod design will withstand large changes in temperature by absorbing stresses due to differential thermal expansion of the non-neutron and the neutron absorbing materials.

It should be understood, of course, that the foregoing disclosure relates to only a preferred embodiment of the invention and that numerous modifications or alterations may be made without departing from the spirit

What is claimed:

1. A control rod of composite construction comprising an element of neutron absorbing material, a pair of structural elements of non-neutron absorbing material sandwiching said neutron absorbing element therebetween, and means joining said elements into a rigid assembly for absorbing stresses arising out of the differential thermal expansions of said elements, said means consisting of at least one dowel interconnecting said elements, said dowel having sharp fins for becoming embedded into said elements upon relative movement of said elements due to said thermal expansions.

2. A control rod having a cruciform cross section comprising flat outer surface structural members of non-neutron absorbing material forming said cruciform section, flat filler elements sandwiched between adjacent structural members consisting of neutron absorbing material, a plurality of holes formed and extending through adjacent members and the filler pieces therebetween, and a closely fitted dowel inserted in each of said holes for making said rod of integral construction, each said dowel being provided with at least one sharp annular fin, for engaging with each material of said filler element and structural members to prevent loosening of said dowel under forces due to thermal expansions of each said material, each said dowel being completely contained in its hole with the opposite outer surfaces of each said dowel being welded over.

3. A control rod having a cruciform cross section with four blades comprising a filler element for each blade composed of neutron absorbing material, a plurality of four extended angles with adjacent legs of opposite angles enclosing a filler element forming a sandwiched construction, said angles composed of a structural non-neutron absorbing material, and means for pinning each filler element and adjacent angle legs into a rigid sandwiched construction capable of absorbing stresses due to large changes in temperature without destroying said sandwiched construction, said means including a plurality of holes formed in said blades extending through adjacent angle legs and the filler element therebetween, and a dowel completely and tightly fitted in each of said holes, each dowel having sharp annular fins for engaging each of the angle legs and said filler element for preventing the disengagement of said dowels from said holes due to expansion of said legs and element arising out of differential thermal expansions.

References Cited in the file of this patent

UNITED STATES PATENTS

| | | |
|---|---|---|
| 2,983,659 | Treshow | May 9, 1961 |
| 2,990,360 | Porembka | June 27, 1961 |

FOREIGN PATENTS

| | | |
|---|---|---|
| 1,244,777 | France | Sept. 19, 1960 |